Aug. 23, 1966   E. B. KATZENMEYER ETAL   3,268,643
METHOD OF MOLDING PISTON CUPS
Filed May 29, 1963

INVENTORS
EDWIN B. KATZENMEYER
BY DONALD E. RICHARDS
John D. Haney
ATTY.

United States Patent Office 3,268,643
Patented August 23, 1966

3,268,643
METHOD OF MOLDING PISTON CUPS
Edwin B. Katzenmeyer and Donald E. Richards, Akron, Ohio, assignors to The B. F. Goodrich Company, New York, N.Y., a corporation of New York
Filed May 29, 1963, Ser. No. 284,126
5 Claims. (Cl. 264—259)

This invention relates to the art of molding rubber and corresponding elastomeric materials. More particularly, it relates to the manufacture of molded articles in which two dissimilar moldable compounds or materials are combined integrally by injection or transfer molding techniques. The invention is especially useful for the manufacture of piston cups which have a hard piston-engaging bottom made of one moldable material and much softer annular cylinder-engaging sealing lips of a different moldable material.

Piston cups ordinarily have been molded of a single homogeneous molding material which is relatively soft so that the sealing lips provide an effective seal against a cylinder wall on the pressure side of a piston. The operating characteristics of a piston cup can be improved by making its bottom piston-engaging cup portion harder and more rigid than the sealing lip. The most satisfactory way to achieve the latter construction, however, is to mold the bottom portion of a molding compound or material which is different from the compound or materials for the sealing lip. Prior to this invention, no satisfactory way of molding piston cups with such dissimilar materials has been known by which such cups can be produced with the dimensional accuracy and the efficiency with which the single soft compound piston cups can be made.

For maximum dimensional accuracy and efficiency, piston cups have been made by the so-called injection or transfer molding techniques in which the moldable material is forced under intense pressure through sprues into a molding cavity denfied by an assemblage of accurately made mold pieces. Prior to this invention, attempts to use these techniques for making piston cups which embody two different molding compounds have been unsuccessful because one compound displaced or "washed" the other in the mold cavity. The compounds ordinarily used are vulcanizable compounds of natural or man-made rubber. Although these compounds have significantly different hardness characteristics when cured, the two compounds in their uncured state (i.e. when they are placed in molds) have almost the same plasticity. Accordingly, attempts to inject the sealing lip compound into a cavity already containing a preformed bottom compound have resulted merely in displacement or "washing" of the bottom compound to the wrong locations in the mold so that the resulting molded product is useless as a piston cup.

According to the present invention, piston cups embodying two different molding materials or compounds can be made successfully by the foregoing transfer or injection molding techniques. In the improved method, the compound for forming the bottom of the piston cup is initially preformed or shaped into a generally flat circular disc. The disc is inserted into the bottom molding regions of the molding cavity and enclosed within the cavity when the mold is closed. The lip-forming compound or material is injected thereafter into the cavity but the latter compound is directed into the cavity only at a series of arcuately spaced locations close to the periphery of the preformed disc and in a direction to press the bottom of the disc axially against the bottom of the cavity. As the injection of the lip-molding compound continues in this manner, it fills the available remaining space in the cavity not occupied by the disc. Notwithstanding the intense pressure under which the lip-forming compound is injected into the cavity, we have found that by directing it as described there is no displacing or washing of the disc compound.

The invention will be further described with reference to the accompanying drawings which show in semi-schematic form the preferred manner of practicing the present invention.

Figure 1:
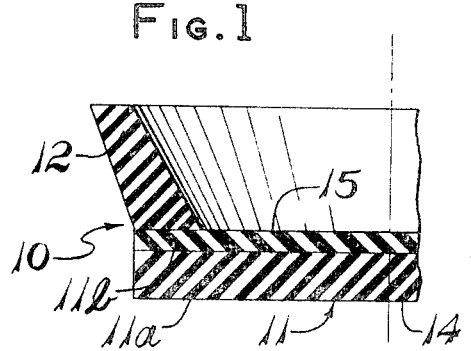
FIG. 1 is an axial cross section of a hard bottom piston cup made with dissimilar rubber compounds.

A piston cup 10 in FIG. 1 includes a piston-engaging bottom portion 11 and an annular sealing lip 12 molded integrally with the bottom portion. The bottom 11 is made primarily of a vulcanizable elastomeric composition which in its cured state is flexible but a relatively hard rubbery composition. In contrast, the sealing lip 12 is a vulcanizable rubber compound which in its cured state is appreciably more flexible and softer than the bottom portion.

The relative terms "hard" and "soft" as used in this specification are with reference to the standard "Durometer" scales commonly used by those skilled in this art for measuring "hardness" of rubber and plastic materials. A typical piston cup made according to this invention may have its lip compound in its cured state measure about 60 Durometer (Shore A scale), whereas the bottom compound in its cured state may be of 85–95 Durometer (Shore A). The term "hard" with reference to the bottom of the piston cup is not necessarily intended to refer to the traditional bone hard brittle "hard rubber" compounds although the present invention may be practiced with the use of such compounds.

Figure 2:
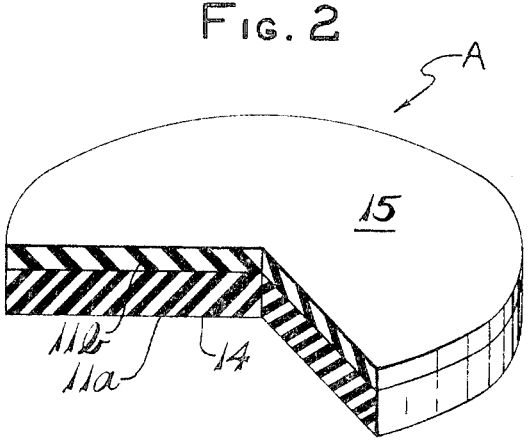
FIG. 2 is a view showing a preformed disc in its uncured state used for forming the bottom of the piston cup.

In the preferred procedure provided by this invention for making the piston cup 10, the bottom portion 11 is initially preformed into the shape of a generally flat disc A composed of two uncured rubber layers 11a and 11b as best shown in FIG. 2. Layer 11a is an uncured rubber compound which, when cured, will provide the hard bottom desired for the piston cups. The other layer 11b is an uncured rubber compound which is the same or very similar to the soft-curing compound from which the sealing lip 12 is made. The hard-curing layer 11a is thicker than the soft-curing layer 11b so that most of the bottom 11 consists of the hard-curing compound.

The uncured bottom disc A consisting of layers 11a and 11b is preferably made by laminating in a calender a large flat sheet of the hard-curing compound to a much thinner sheet of the soft-curing compound. In their uncured state these sheets will ordinarily adhere to each other adequately because of their natural tackiness, although adhesives may be used if necessary if the particular compounds used are not self-adhering. The discs A are then cut from the resulting laminated uncured sheet.

The preformed disc A has plane lower and upper mold-engaging surfaces 14 and 15, respectively.

Figure 4:
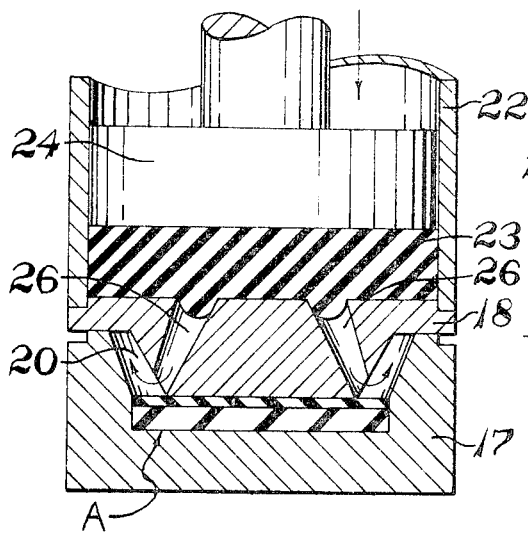
FIG. 4 is a view similar to FIG. 3 but showing the mold parts in closed position and the initial stage of the step of injecting the lip compound into the molding cavity.
Figure 3:
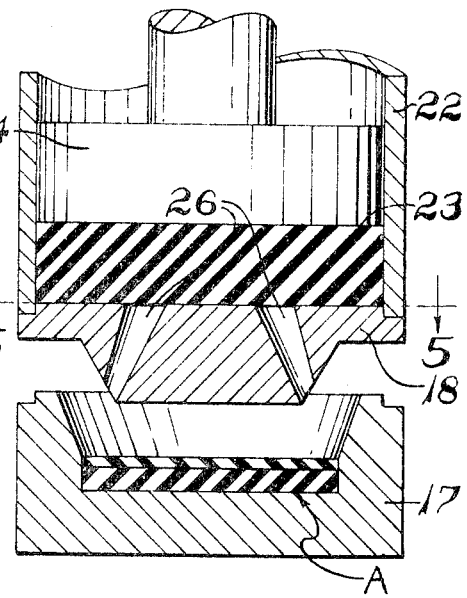
FIG. 3 shows, schematically, a transfer molding apparatus in that stage of the method in which the mold parts are open and the bottom forming disc has been inserted into the mold.

FIGS. 3 and 4 show in schematic form the principal features of preferred molding apparatus. The apparatus illustrated is a transfer mold apparatus which includes a lower mold piece 17 and an upper mold piece 18 which mate together as shown in FIG. 4 when the mold is closed to define an annular closed cavity 20. The molding cavity 20 is annularly symmetrical on the center line indicated in FIG. 4. The cavity illustrated is the approximate shape of a piston cup suitable for use in an automobile brake piston.

On the upper side of mold piece 18 there is a cylinder 22 which receives a charge of a soft-curing molding compound 23, from which the sealing lip 12 is molded. A ram 24 reciprocates in cylinder 22 under the influence of a suitable force generator (not shown) to express the charge 23 through a series of sprues 26 in mold piece 18.

Figure 5:
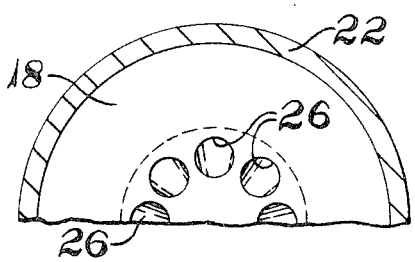
FIG. 5 is a view taken along the line 5—5 of FIG. 3.

Referring to FIG. 5, the sprues 26 are grouped at arcuately spaced intervals in a circular pattern concentric with the cylinder 22. As shown in FIG. 4, sprues 26 provide communication between the region inside cylinder 22 containing the charge 23 and the mold cavity 20 when the mold members are closed. The sprues 26 diverge angularly from each other from the charge-receiving region to the mouth of these sprues opening into the mold cavity 20. The mouths of the sprues 26 are located at the region of the mold surface on mold piece 18 which forms an interior corner between the lip and the bottom portion of the piston cup.

The preformed uncured disc A is inserted into mold piece 17 in unvulcanized condition in the manner illustrated in FIG. 3. The lower surface 14 of this disc fits flat against the bottom mold surface of mold piece 17 and the diameter of the disc is substantially equal to the diameter of the bottom-molding region of mold piece 17.

The mold pieces 17 and 18 are then brought to their closed position shown in FIG. 4 (by means not shown) so that the surface of upper mold piece 18 surrounded by the sprues fits flat against the upper plane surface 15 of the preformed disc. It is not necessary for the mold pieces to exert squeezing pressure on the disc when the mold is closed, although the thickness of the disc is preferably such that some slight pressure is exerted on the uncured disc when the mold is closed. Thereafter a charge 23 of the lip-forming compound is placed inside the cylinder 22. The ram 24 is then depressed forcefully against the charge 23 to express this charge through the multiplicity of sprues 26 into the molding cavity.

The lip-forming compound or charge 23 passes downwardly through the sprues and then is distributed into the mold cavity substantially in the manner suggested by the small arrows inside the cavity 20 in FIG. 4. The sprues 26 direct the charge 23 into the molding cavity in small separate streams which enter the cavity and initially engage the preformed disc A only at a series of arcuately spaced locations opposite the mouths of the sprues on the peripheral portion of the disc. As the injection continues the incoming individual streams of the charge 23 build up on the periphery of the disc and flow in a uniform manner to the remaining regions of the cavity 20 until the latter is entirely filled. Throughout the filling operation the direction of the incoming streams of charge 23 is such that the preformed disc is urged axially against the bottom of the disc. After the cavity is filled, molding pressure is maintained by the ram 24 and the mold parts are subjected to curing temperature for a period sufficient to cure the respective compounds and fuse these compounds integrally together.

Should the preformed disc be thinner than the space between the opposing plane molding surfaces of mold pieces 17 and 18 which mold the bottom portion, the incoming streams of charge 23 will also cover the upper surface 15 of the disc until the mold is completely filled. So long as the streams are directed initially to the periphery of the disc there is no objectionable wiping or displacement of the disc. Accordingly the layer 11b of the disc A in FIG. 2 may be omitted insofar as the molding operations are concerned. Preforming the disc A with both layers 11a and 11b is convenient to improve adhesion and to minimize the time required for the mold equipment to inject the lip-compound.

Although the foregoing description is with respect to compounds of vulcanizable rubber ordinarily used and preferred for making these cups, it is possible to practice the invention with other materials not normally regarded as rubbers if these materials have similar physical characteristics during molding and under operating conditions as do the preferred vulcanizable rubber compounds discussed herein. The present invention is not limited to the use of the particular materials described herein for practicing the invention.

We claim:
1. A method of making piston cups having a hard circular piston-engaging bottom and an annular cylinder-engaging lip which is integral with and significantly softer than said bottom, said method comprising:
  (A) forming a bottom portion of the cup in a shape of a disc from a first moldable vulcanizable rubber compound which when uncured is deformable but when cured is significantly harder than the lip portion of the cup;
  (B) enclosing said disc while in its unvulcanized state in a multi-part sprue-loading piston cup molding cavity with said disc on the bottom molding surface of said cavity and occupying only a part of the total volume of the cavity;
  (C) injecting into the cavity a second moldable vulcanizable rubber compound to form the lip of said piston cup, which second compound when cured is significantly softer than said first compound;
  (D) directing said second compound as it is so injected so that it enters said cavity only at a series of arcuately spaced locations close to the periphery of said disc and initially engages only the periphery of the disc to press the disc axially against the bottom of the cavity;
  (E) continuing the injection of said second compound at said locations and in said direction until said second compound covers said disc and fills all available space in said cavity not occupied by said disc;
  (F) then vulcanizing said compounds in said cavity.

2. The method of making piston cups having a hard circular piston-engaging bottom and an annular cylinder-engaging lip which is integral with and significantly softer than said bottom, said method comprising:
  (A) forming a bottom portion of the cup in the shape of a disc of a first moldable vulcanizable material which, under service conditions in which the cup is used, is flexible but harder than the lip portion of the cup;
  (B) enclosing said disc in a multi-part sprue-loading piston cup molding cavity with said disc on the bottom molding surface of the molding cavity and occupying only a part of the total volume of the cavity;
  (C) injecting into the cavity a second moldable vulcanizable material to form the lip portion of said piston cup, which second material under service conditions in which the cup is used is significantly softer than said first moldable material;
  (D) directing said second material as it is so injected so that it enters said cavity only at a series of arcuately spaced locations close to the periphery of said disc and initially engages only the periphery of the disc to press the periphery of the disc axially against the bottom of the cavity;
  (E) continuing the injection of said second moldable material at said locations and in said direction until said second compound covers said discs and fills all available space in said cavity not occupied by said disc; and
  (F) then treating both said moldable materials in said cavity under conditions appropriate to their chemical properties to mold said materials integrally into a finished piston cup.

3. The method of making piston cups defined in claim 2 wherein said disc is a lamination of a layer of said first moldable vulcanizable material and a layer of said second moldable vulcanizable material, the latter layer being superimposed on the former layer, and the disc being positioned in the mold cavity with the latter layer directed toward the molding sprues.

4. The method of making piston cups in which a bottom portion of the cup is made in the form of a disc of a first deformable moldable vulcanizable material which provides a hard piston-engaging bottom, and in which the cylinder-engaging lip portion of the cup is made of a second deformable moldable vulcanizable material which is softer than said bottom, said lip portion being molded integrally to said bottom by injecting said second material into a molding cavity against said disc which has been previously enclosed in the bottom molding region of said cavity, said method being characterized in that it includes the steps of:

(A) directing said second material into said cavity only at a series of spaced apart locations close to the periphery of said disc in said cavity and in a direction to press the periphery of the disc axially against the bottom of the cavity, the flow of said second material at said peripheral locations acting to prevent deformation of the periphery of said disc, and (B) continuing the injection at said locations and in said direction until said second molding material covers said disc and fills all available space in said cavity not occupied by said disc.

5. The method defined in claim 4 and further characterized by the steps of:

(A) preforming said disc as a lamination of a layer of said first moldable material and a layer of said second moldable material, the latter layer being superimposed on the former, and (B) positioning said lamination in the mold cavity with said latter layer directed toward the locations therein at which said second molding material enters the mold cavity.

References Cited by the Examiner

UNITED STATES PATENTS 2,700,186   1/1955   Stover _____ 264—328
3,122,598   2/1964   Berger _____ 264—328

FOREIGN PATENTS 814,337   6/1959   Great Britain.

ALEXANDER H. BRODMERKEL, *Primary Examiner.*

F. S. WHISENHUNT, *Assistant Examiner.*